United States Patent [19]
Pittie et al.

[11] 3,920,789
[45] Nov. 18, 1975

[54] SEPARATION OF PGM'S FROM EACH OTHER AND FROM GOLD

[75] Inventors: Willem Hubert Pittie, Roodepoort; Gerhardus Overbeek, Florida; Kingsley Ferguson Doig, Johannesburg, all of South Africa

[73] Assignee: Swarsab Mining, Exploration & Development (Proprietary) Limited, Johannesburg, South Africa

[22] Filed: Jan. 30, 1975

[21] Appl. No.: 545,518

Related U.S. Application Data
[63] Continuation-in-part of Ser. No. 384,823, Aug. 2, 1973.

[52] U.S. Cl. ............... 423/22; 75/101 R; 75/121; 75/118; 423/27; 423/34; 423/35; 423/38; 423/46; 423/95

[30] Foreign Application Priority Data
Aug. 10, 1972 South Africa ............... 72/5489

[51] Int. Cl.² .................. C01G 7/00; C01G 55/00
[58] Field of Search ........... 423/27, 22, 34, 35, 38, 423/23, 46; 75/101 R, 118, 121

[56] References Cited
UNITED STATES PATENTS
| | | | |
|---|---|---|---|
| 1,315,660 | 9/1919 | Ferguson | 423/22 |
| 2,875,040 | 2/1959 | Barabas | 423/22 |
| 3,024,084 | 3/1962 | Raper et al. | 423/22 |
| 3,767,760 | 10/1973 | Hongen et al. | 423/22 |

OTHER PUBLICATIONS
Bremish, "Talanta," Vol. 5, 1960, pp. 1–35.

*Primary Examiner*—Herbert T. Carter
*Attorney, Agent, or Firm*—Berman, Aisenberg & Platt

[57] ABSTRACT

At least one of rhodium, iridium and ruthenium is separated from at least one of gold, platinum and palladium in a solution of such metals. Separation if effected by (a) evaporating the solution to dryness, (b) rendering any rhodium, iridium and ruthenium (in thus-obtained residue) aqua-regia insoluble by heating the residue at a temperature within the range of about 575° to 625° C, and (c) leaching thus-heated residue with aqua regia to remove any gold, platinum or palladium therefrom.

7 Claims, 1 Drawing Figure

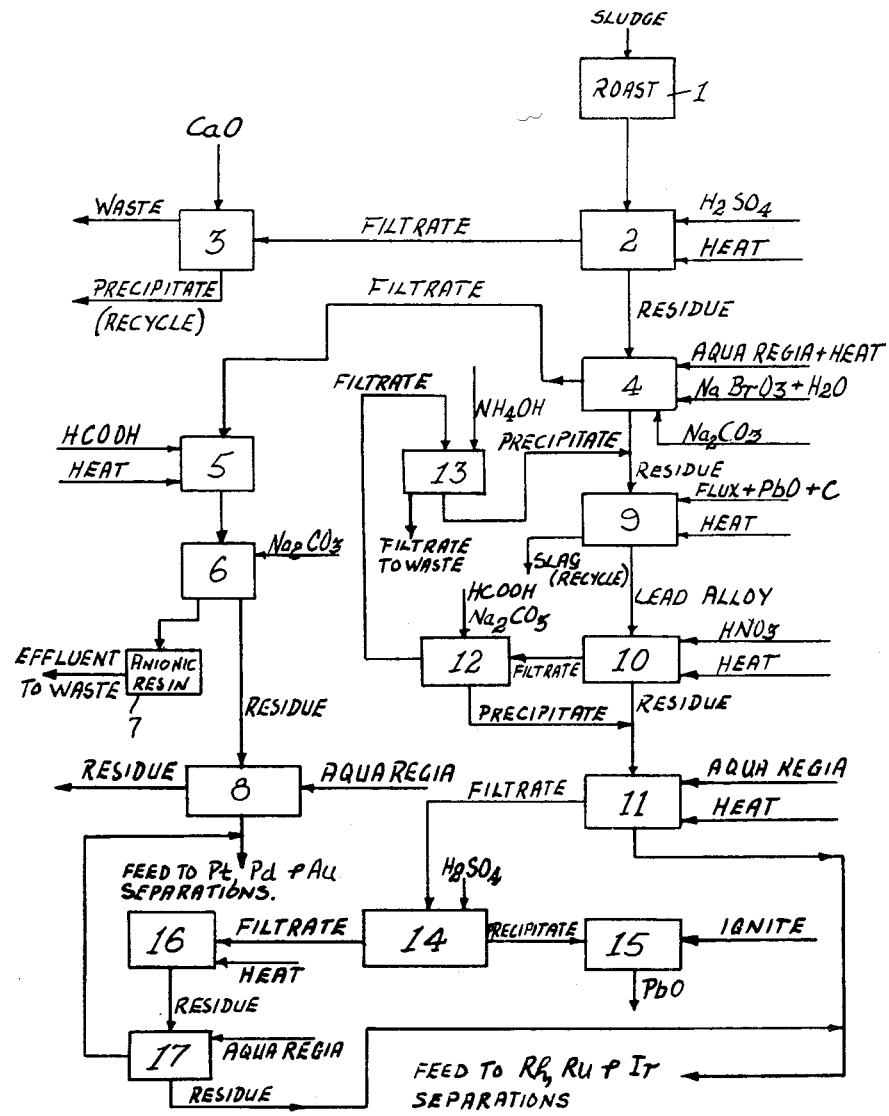

SEPARATION OF PGM'S FROM EACH OTHER AND FROM GOLD

RELATED APPLICATION

This application is a continuation-in-part of application Ser. No. 384,823 filed on Aug. 2nd, 1973.

BACKGROUND

This invention relates to the separation and purification of mixtures of Platinum Group Metals (hereinafter referred to as "PGMs") and gold, and is particularly concerned with the separation of rhodium from platinum, palladium and/or gold.

In general, five PGMs, namely: platinum, palladium, iridium, ruthenium and rhodium, occur together in nature with gold, and in some cases a sixth PGM, viz. osmium, and these elements must be separated from each other and purified in order to be useful in trade or industry. In general, an initial separation of these elements into two groups is effected by treating the basic mixture, which is often a matte leach residue or sludge, with aqua regia, in which case the platinum, palladium and gold dissolve, whilst the iridium, ruthenium and rhodium remain substantially in the residue, resulting from this process. The two groups of metals obtained in this manner are then subjected to generally long and complicated separation procedures in order to separate and purify the individual metals.

The two groups thus obtained often do not have a desirably high degree of split and in particular, appreciable amounts of platinum, palladium and gold are often found together with the rhodium, iridium and ruthenium, and rhodium is often dissolved to undesirable extents with the platinum, palladium and gold. Also, undesirably large amounts of silica and base metals are generally present in the group consisting of rhodium, iridium and ruthenium.

SUMMARY OF THE INVENTION

Rhodium, iridium and/or ruthenium is separated from a solution containing same in addition to gold, platinum and/or palladium. The separation is effected by (a) evaporating the solution to dryness to obtain a residue, (b) rendering any rhodium, iridium and/or ruthenium in the residue aqua-regia insoluble by heating said residue at a temperature of from about 575° to 625° C, and (c) leaching thus-heated residue with aqua regia to remove from the residue any gold, platinum and palladium therein and to leave in said thus-leached residue initially-contained rhodium, iridium and ruthenium in an aqua-regia-insoluble form.

It is the object of this invention to provide a process for the treatment of mixtures of PGMs and gold which will provide an improved separation of the two basic groups, i.e. Pt, Pd and Au on the one hand, and Rh, Ir and Ru on the other, and also which will enable better yields and/or a more pure rhodium product to be obtained.

This invention provides a process for the treatment of a mixture of platinum group metals and gold wherein the mixture comprises, e.g., rhodium together with at least one other metal selected from the group consisting of platinum, palladium and gold, the mixture optionally including iridium and ruthenium. The process is reflected, e.g., by the steps:

a. treating the metals present to form either halide or perchlorate salts thereof
b. igniting said salts at a temperature of from 575° to 625° C for a period of time sufficient to enable the salts to decompose,
c. subsequently subjecting the ignition residue to an aqua regia leach to dissolve platinum, and palladium and gold present in the residue, and leave rhodium, iridium and ruthenium in the undissolved condition.

Further features of the invention provide for the mixture to be pre-treated for the removal of any alkali earth metals (Mg, Ca, etc.) or base metals forming the major contaminents of PGMs, such as Cu, Ni, Fe and Al, for the salts of the metals to be obtained by evaporating to dryness an aqua regia leach solution obtained by leaching a solid mixture of platinum group metals and gold; for the ignition to be carried out at about 600° C, for the subsequent aqua regia leach step to be performed by preliminarily boiling the ignition residue with concentrated hydrochloric acid, and thereafter adding the appropriate amount of concentrated nitric acid to form aqua regia.

The removal of alkaline earth metals and base metals may conveniently be achieved by fusing the PGMs and gold with a lead compound, a reductant where necessary and a flux to form an alloy of PGMs, gold and lead, removing the slag formed and subsequently subjecting the alloy to a nitric acid leach to remove lead.

It has been found that the formation of such an alloy results in silica and base metals being removed to a greater extent than in other conventional processes.

The alloying procedure is preferably effected at a temperature of between 1100° C to 1200° C. The lead compound is preferably lead oxide, but could also be, for example, lead carbonate, lead sulphide, lead sulphate or lead acetate. The flux should be basic flux, such as sodium carbonate, preferably admixed with a melting point depressant, such as borax or fluorspar. The reductant which is necessary in many cases is preferably charcoal. Where lead acetate or lead formate is used as the lead compound, no reductant would be necessary.

DETAILS

In order that the invention may be fully understood, various examples thereof as applied to separation processes will now be described with reference to the accompanying flow sheet which is a flow sheet illustrating the basic separation steps embodying the invention.

EXAMPLE I

In general, concentrates of PGMs and gold are obtained in the form of matte leach residues or sludges and the PGMs and gold are processed from this stage in order to separate and purify them.

In this example a matte leach sludge containing PGMs and gold is treated according to the following general procedure which also embodies the results and processes of a specific example wherein the quantities of different reagents actually added are given in parentheses throughout the description.

The sludge used as a starting material in this embodiment contained the following:

| Element | | % | Element | % |
| --- | --- | --- | --- | --- |
| Platinum | (Pt) | 6.92 | Copper | 6.91 |
| Palladium | (Pd) | 3.04 | Cobalt | 0.19 |
| Gold | (Au) | 0.59 | Iron | 4.57 |
| Rhodium | (Rh) | 0.32 | Magnesia | 0.35 |
| Ruthenium | (Ru) | 0.60 | Nickel | 3.50 |
| Iridium | (Ir) | 0.08 | Organic matter $C_n(H_2O)_m$ | 23.1 |
| | | | Potassium | 0.03 |
| Silver | (Ag) | 0.03 | Silica | 12.92 |
| | | | Sodium | 9.25 |
| Alumina | ($Al_2O_3$) | 3.60 | Sulphur (Total) | 19.63 |
| Antimony | (Sb) | 0.05 | Tellurium | 0.29 |
| Bismuth | (Bi) | 0.11 | Zinc | 0.001 |
| Calcium Oxide | (CaO) | 0.49 | Other + $O_2$ + $H_2O$ (By diff) | 3.43 |
| | | | | 100.00 |

Firstly 2.5 kg of the sludge was roasted in a stream of air at 600° C for 2 hours in order to convert any sulphides and free sulphur to oxides at stage 1.

The roasted material was boiled at stage 2 for 2 hours with 20% $H_2SO_4$ (3 l) under a reflux with stirring, cooled to ± 55° C and filtered to dissolve the bulk of the base metals present.

To the filtrate calcium oxide (CaO) was added at stage 3 to precipitate all the nickel, copper, PGMs and gold in the filtrate. This precipitate was kept and contained 30 mg platinum, 100 mg palladium, 10 mg gold, 50 mg rhodium and 40 mg iridium. In practice this precipitate would be recycled to a matte smelter.

The residue obtained after the sulphuric acid treatment was then leached at stage 4 with aqua regia (1½ l) for 3 hours. This aqua regia leach and all subsequent aqua regia leachings were carried out as follows:

The material was boiled with the required amount of hydrochloric acid (HCl) under reflux for 30 minutes. The required quantity of nitric acid ($HNO_3$) was then added slowly over a period of 60 minutes. The mixture was then allowed to boil for the remaining length of time (i.e. 1½ hours). The reason for following this procedure is to dissolve certain oxides of palladium which are rendered passive in the presence of nitric acid.

Sodium bromate ($NaBrO_3$) (30g) was then added to the solution which was allowed to boil for a further 30 minutes after diluting the solution with water (1.5 – 3 l) to oxidise the PGMs and gold to their highest stable oxidation states. The pH was then adjusted to 6.5 with sodium carbonate (± 60° C) (1 kg) to precipitate all the metals except platinum as their hydrated oxides. The solution was allowed to stand for 20 minutes and then filtered under vacuum. The platinum was removed in this manner in order to decrease the bulk of the PGMs and gold to be subject to lead alloying by about 50%.

To the filtrate [+90% of platinum (Pt) in the feed] formic acid (0.2 l) was added at stage 5 and the solution boiled under reflux with stirring for 5 hours. Sodium carbonate ($Na_2CO_3$) (0.3 kg) was added at stage 6 stage-wise over a period of 1 hour until a pH 5.0 was obtained. The solution was then boiled for a further 60 minutes, cooled to 60° C and filtered under vacuum. These steps 5 and 6 were performed in order to precipitate platinum from the solution.

This filtrate was passed over an anionic exchange column at stage 7 and the effluent discarded. This effluent contained 100 mg Pt, 10 mg Pd, 10 mg Au, 1 mg Rh and 25 mg Ir.

The precipitate was dissolved at stage 8 in aqua regia (1.0 l) cooled and filtered. The obtained residue was silver chloride (AgCl).

This aqua regia filtrate contained the bulk of the platinum. This platinum was combined with the bulk of the palladium and gold as described hereinafter, and separation of these PGMs effected by a separate procedure. This procedure will not be described herein, since it is irrelevent to the basic separation steps provided by this invention.

The residue/precipitate obtained from the initial aqua regia leach and sodium carbonate precipitation at stage 4 (± 1400 g) was mixed with a Flux A and a Flux B defined below and fused at stage 9 for 75 minutes at 1140° C. 2.5 kg of Flux A per kg of residue and 335 g of Flux B per 100 g of PGM + Au to be collected were used. These fluxes had the following compositions:

FLUX A (active flux) (3.5 kg)

| (1) | Borax $Na_2B_4O_7$ | : | 20% (0.75 kg) |
| --- | --- | --- | --- |
| (2) | Sodium carbonate $Na_2CO_3$ | : | 80% (2.75 kg) |

Flux B (collector) (0.55 kg)

| (1) | Litharge PbO | : | 90% (0.5 kg) |
| --- | --- | --- | --- |
| (2) | Charcoal C | : | 10% (0.05 kg) |

The molten material was poured into iron moulds where it was allowed to cool. The lead buttons thus obtained were separated from the slag, and the slag was crushed and kept but in practice would be returned to the matte smelter. The slag contained 520 mg Pt, 230 mg Pd, 45 mg Au, 24 mg Rh, 45 mg Ru (ruthenium) and 5 mg Ir.

This procedure was found to remove alkaline earth salts, base metals, and gangue material effectively from the platinum group metals and gold. It also renders platinum, palladium and gold aqua regia soluble; rhodium and iridium partially soluble and ruthenium insoluble.

The lead buttons were crushed and then boiled at stage 10 for 5 hours under reflux with 20% $HNO_3$ (5.5 l) in order to remove lead. The solution was cooled to 55° C and filtered under vacuum. The residue was fed to a subsequent aqua regia leach step indicated at stage 11.

Formic acid (0.05 l) was added at stage 12 to the filtrate from the nitric acid leach of stage 10 and the pH adjusted to 2.0 with sodium carbonate $Na_2CO_3$ (0.3 kg) to precipitate any PGMs and gold dissolved by the nitric acid. The solution was then stirred for 5 hours at room temperature and filtered under vacuum.

The obtained precipitate was combined with the residue obtained from the nitric acid leach step at stage 10 and fed to the aqua regia leach step at stage 11. NH₄OH was added at stage 13 to the filtrate to precipitate the lead and any PGM + Au present, and this precipitate was dried - ignited and in practice would be returned to the lead fusion step at stage 9.

The combined residue/precipitate was boiled at stage 11 with aqua regia (0.75 l) for 3 hours under reflux. The solution was cooled to 55° C and filtered under vacuum. The residue formed part of the feed to the process for separating rhodium, iridium and ruthenium from each other. This residue contained 850 mg Pt, 700 mg Pd, 100 mg Au, 5000 mg Rh, 14720 mg Ru and 1420 mg Ir. The precious metals usually make up approximately 50% of this by-metal concentrate, the remaining 40% being lead chloride ($PbCl_2$).

To the filtrate from the aqua regia leach step at stage 11 the stoichiometric amount of $H_2SO_4$ plus a 10% excess (100 ml of 50% $H_2SO_4$) was added at stage 14 to precipitate lead present in this solution. The solution was boiled for 30 minutes, cooled to 55° C and filtered.

The precipitated lead sulphate was ignited at stage 15 to litharge (PbO) and was ready to be recycled to the lead fusion step.

The filtrate from the lead precipitation step was evaporated to dryness at stage 16 and the chloride salts then obtained ignited at 600° C for two hours. This temperature was found to be important in rendering rhodium in the residue aqua regia insoluble, and yet obtaining a good split in the metals. Igniting the salts at any temperature between 575° and 625° C has been found to be effective, but below this range the rhodium is, to an undesirable extent, left in the soluble form, whilst igniting above this range results in increasing amounts of palladium being rendered insoluble.

The ignition product was then boiled at stage 17 with aqua regia (0.75 l) under reflux for 3 hours. The solution was cooled and filtered under vacuum.

The residue was combined with the residue from the aqua regia leach step of stage 11 effected after alloying to give a combined feed for the separation of the secondary PGMs, namely: rhodium, ruthenium and iridium having a PGM and gold content of 1130 mg Pt, 850 mg Pd, 120 mg Au, 7480 mg Rh, 14,920 mg Ru and 1720 mg Ir.

The filtrate obtained from the final aqua regia leach step of stage 17 was combined with that obtained in the aqua regia leach step of stage 8 performed on the metals dissolved in the initial leach step 4 to provide a feed for the separation process of platinum, palladium and gold. This feed had a PGM and gold content of 171,210 mg Pt, 74,790 mg Pd, 14,560 mg Au, 200 mg Rh, 25 mg Ru, and 210 mg Ir.

EXAMPLE II

An aqua regia solution, containing 17,150 mg Pt, 74,940 mg Pd, 14,580 mg Au, 2680 mg Rh, 225 mg Ru and 321 mg Ir, was evaporated to dryness in a silica dish. The chloride salts thus obtained were ignited at 600° C for 2 hours. The ignited residue was then boiled with 600 ml of concentrated HCl under reflux for 30 minutes, after which 200 ml of concentrated HNO₃ was added to the mixture and the solution boiled for a further 120 minutes. The solution was then allowed to cool and was filtered under vacuum.

The residue, which contained 280 mg Pt, 150 mg Pd, 20 mg Au, 2600 mg Rh, 200 mg Ru and 300 mg Ir, was then processed for the separation and purification of rhodium, ruthenium and iridium while the filtrate, which contained 16,870 mg Pt, 74,790 mg Pd, 14,560 mg Au, 80 mg Rh, 25 mg Ru and 21 mg Ir, was processed for the separation and purification of Pt, Pd and Au.

EXAMPLE III

A material, containing 3390 mg Pt, 2550 mg Pd, 360 mg Au, 22,440 mg Rh, 44,760 mg Ru and 5160 mg Ir, was fused with 10 times its own weight of $NaHSO_4 \cdot H_2O$ at 600° C for 1 hour in a silica pot. The melt was then dissolved in 4 litres of 1:1 hydrochloric acid. The solution was then filtered to remove those metals not dissolved by the above outlined procedure.

The filtrate contained 300 mg Pt, 200 mg Pd, 20 mg Au, 19,500 mg Rh, 60 mg Ru and 40 mg Ir. The filtrate was then brought to boil and 15 g of $NaBrO_3$ was added. The pH of the solution was subsequently adjusted to 8.5 with $Na_2CO_3$ and filtered.

The precipitate of the above, which contained 100 mg Pt, 1980 mg Pd, 0 Au, 19,400 mg Rh, 60 mg Ru and 40 mg Ir, was then dissolved in 100 ml concentrated HCl, evaporated to dryness and subsequently ignited at 600° C for 2 hours. The ignited material was then leached with 100 ml of aqua regia as in Example II to dissolve Pt and Pd. The results of the test are given in the table below:

|  | Pt | Pd | Au | Rh | Ru | Ir |
|---|---|---|---|---|---|---|
| mgm of metal contained in the filtrate | 100 | 1900 | — | 400 | — | — |
| mgm of metal in the residue | — | 80 | — | 19000 | 60 | 40 |

EXAMPLE IV

An experiment identical to that of Example II, except that the aqua regia solution containing the precious metals was evaporated to dryness in the presence of 200 ml of 70% perchloric acid, was conducted to convert the precious metal chloride species to their perchlorate salts. As in Example II, in excess of 96% of the Rh present was separated from the Pt, Pd and Au.

It will therefore be appreciated that the use of the present invention enables the two groups of PGMs and gold to be effectively separated from each other and from base metals and gangue contained in the original feed. Also, in cases where osmium is present, the process operates effectively.

What is claimed is:

1. A process for treating a mixture of platinum group metals and gold wherein the mixture comprises rhodium together with at least one other metal selected from the group consisting of platinum, palladium and gold, the mixture optionally including iridium and/or ruthenium, said process comprising the steps of:-
    a. treating the metals present to form either a halide or perchlorate salt thereof,
    b. igniting the resultant salt at a temperature of from 575° to 625° C for a period of time sufficient to enable said salt to decompose, and
    c. subsequently subjecting thus-produced ignition residue to an aqua regia leach to dissolve platinum, palladium and gold present in the residue and to leave any rhodium, iridium and ruthenium in undissolved condition.

2. A process as claimed in claim 1 in which the mixture is essentially free of any alkali earth or base metal.

3. A process as claimed in claim 1 in which the metal salt is a dried aqua regia leach solution of a solid mixture of platinum gold metals and gold.

4. A process as claimed in claim 3 in which the aqua regia leach solution is dried in the presence of perchloric acid.

5. A process as claimed in claim 1 in which the temperature is about 600° C.

6. A process as claimed in claim 1 in which the aqua regia leach of step (c) comprises initially boiling the ignition residue with the required amount of concentrated hydrochloric acid and subsequently adding thereto, the appropriate amount of concentrated nitric acid to form aqua regia.

7. A process for separating at least one member selected from the group consisting of rhodium, iridium and ruthenium from a solution containing same and at least one member selected from the group consisting of gold, platinum and palladium which comprises:
 I. evaporating the solution to dryness to obtain a residue,
 II. rendering any rhodium in the residue aqua-regia insoluble by heating said residue at a temperature of from about 575° to 625° C, and
 III. leaching thus-heated residue with aqua regia to remove from the residue any gold, platinum and palladium therein and to leave in said thus-leached residue initially-contained rhodium, iridium and ruthenium in an aqua-regia-insoluble form.

* * * * *

UNITED STATES PATENT OFFICE
CERTIFICATE OF CORRECTION

Patent No. 3,920,789  Dated November 18th, 1975

Inventor(s) WILLEM HUBERT PITTIE ET AL

It is certified that error appears in the above-identified patent and that said Letters Patent are hereby corrected as shown below:

Page 1, Column 2, in the Abstract, line 3, "if" should read --is--. Column 3, line 23, "under a" should read --under--; line 47, ") to" should read --to--. Column 7, claim 3, line 3, first occurrence, "gold" should read --group--.

Signed and Sealed this sixth Day of April 1976

[SEAL]

Attest:

RUTH C. MASON
*Attesting Officer*

C. MARSHALL DANN
*Commissioner of Patents and Trademarks*